US010054514B2

(12) United States Patent
Brucke et al.

(10) Patent No.: US 10,054,514 B2
(45) Date of Patent: Aug. 21, 2018

(54) VIBRATION EXCITER HAVING LOAD COMPENSATION

(71) Applicant: SPEKTRA SCHWINGUNGSTECHNIK UND AKUSTIK GMBH DRESDEN, Dresden (DE)

(72) Inventors: Martin Brucke, Dresden (DE); Martin Iwanczik, Dresden (DE)

(73) Assignee: SPEKTRA SCHWINGUNGSTECHNIK UND AKUSTIK GMBH DRESDEN, Dresden (DE)

( * ) Notice: Subject to any disclaimer, the term of this patent is extended or adjusted under 35 U.S.C. 154(b) by 11 days.

(21) Appl. No.: 15/124,527

(22) PCT Filed: Feb. 26, 2015

(86) PCT No.: PCT/EP2015/053975
§ 371 (c)(1),
(2) Date: Sep. 8, 2016

(87) PCT Pub. No.: WO2015/135755
PCT Pub. Date: Sep. 17, 2015

(65) Prior Publication Data
US 2017/0016802 A1    Jan. 19, 2017

(30) Foreign Application Priority Data
Mar. 12, 2014    (DE) .................. 10 2014 103 299

(51) Int. Cl.
*G01M 7/02*        (2006.01)
*B06B 1/04*        (2006.01)
(Continued)

(52) U.S. Cl.
CPC .............. *G01M 7/022* (2013.01); *B06B 1/04* (2013.01); *B06B 1/06* (2013.01); *B06B 1/12* (2013.01);
(Continued)

(58) Field of Classification Search
CPC ......... G01M 7/02; G01M 7/025; G01P 21/00; B06B 1/04; B06B 1/06; B06B 1/12; B06B 1/18
(Continued)

(56) References Cited

U.S. PATENT DOCUMENTS 2,773,482 A    12/1956  Dickie
3,393,554 A    7/1968   Tiso
(Continued)

FOREIGN PATENT DOCUMENTS

JP        58133231    *    8/1983

OTHER PUBLICATIONS

International Search Report and Written Opinion issued in PCT/EP2015/053975, dated Jun. 19, 2015.

*Primary Examiner* — J M Saint Surin
(74) *Attorney, Agent, or Firm* — Heslin Rothenberg Farley & Mesiti P.C.

(57) ABSTRACT

A vibration exciter with load compensation for the dynamic excitation of test specimens includes a base, an actuator, an armature which can be moved by the actuator in an excitation direction relative to the base and guided by a linear guiding element parallel to the excitation direction, and a pneumatic load compensator which compensates for the gravity force of at least the armature and the test specimen being excited. A high-quality low-perturbation exciter signal is generated by minimizing friction and other nonlinearities occurring during the load compensation. The linear guiding element of the vibration exciter with load compensation
(Continued)

Figure 1:
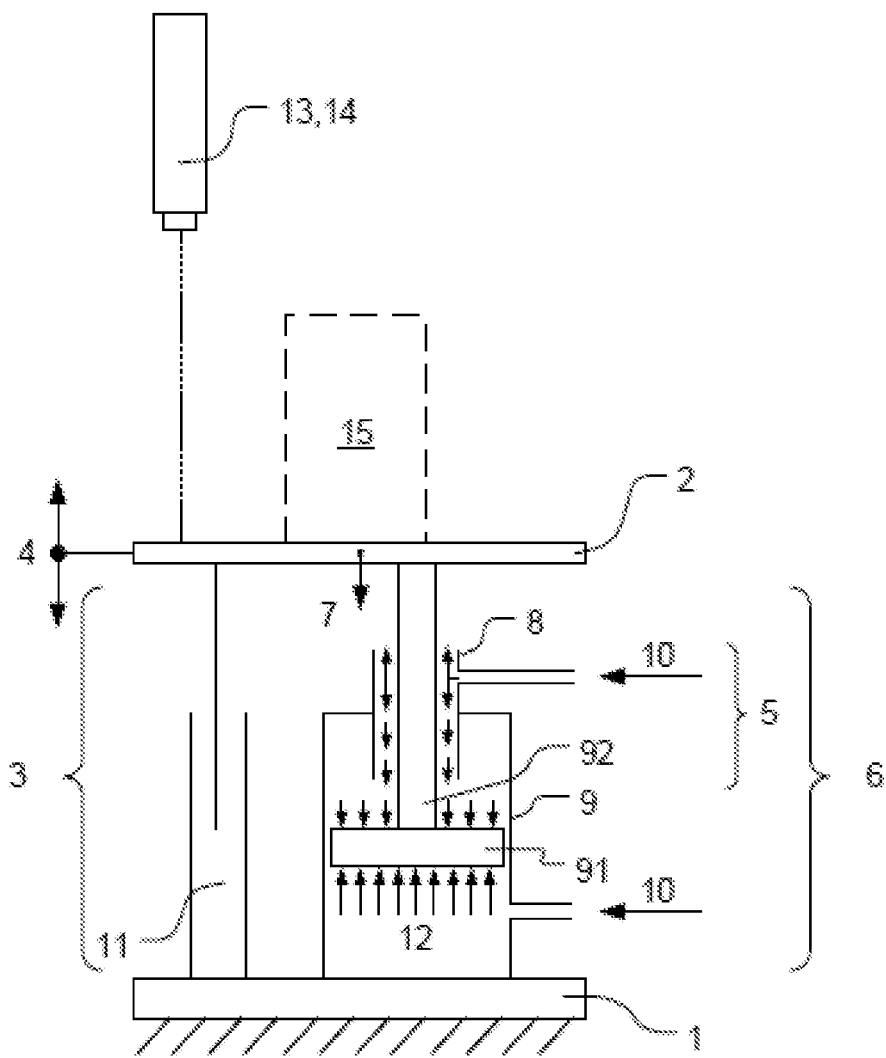

includes an air bearing, and the load compensator includes the linear guiding element.

11 Claims, 2 Drawing Sheets

(51) Int. Cl.
  *B06B 1/06* (2006.01)
  *B06B 1/18* (2006.01)
  *B06B 1/12* (2006.01)
  *G01P 21/00* (2006.01)

(52) U.S. Cl.
  CPC .............. *B06B 1/18* (2013.01); *G01M 7/02* (2013.01); *G01M 7/025* (2013.01); *G01P 21/00* (2013.01)

(58) Field of Classification Search
  USPC .......................................... 73/663
  See application file for complete search history.

(56) References Cited

U.S. PATENT DOCUMENTS

| | | | |
|---|---|---|---|
| 4,011,749 A * | 3/1977 | Cappel | G01M 7/06 73/665 |
| 4,428,238 A * | 1/1984 | Tauscher | B06B 1/183 137/625.65 |
| 5,033,285 A | 7/1991 | Bouche | |
| 6,138,458 A * | 10/2000 | Griffin | F15B 15/088 60/716 |
| 7,540,195 B2 * | 6/2009 | Nelsen | G01M 7/022 73/666 |
| 9,010,188 B2 * | 4/2015 | Tustaniwskyj | G01M 7/022 73/662 |
| 9,733,151 B2 * | 8/2017 | Tustaniwskyj | G01M 7/022 |
| 2003/0155194 A1 | 8/2003 | Kienholz | |

* cited by examiner

VIBRATION EXCITER HAVING LOAD COMPENSATION

CROSS REFERENCE TO RELATED APPLICATIONS

This application is the National Phase filing under 35 U.S.C. § 371 of International Application No. PCT/EP2015/053975, filed on Feb. 26, 2015, and published on Sep. 17, 2015 as WO/2015/135755 A1, and claims priority to German Application No. 102014103299.3, filed on Mar. 12, 2014. The contents of each of the prior applications are hereby incorporated by reference herein in their entirety.

BACKGROUND ART

The invention concerns a vibration exciter with load compensation for the dynamic excitation of test specimens, comprising a base, an actuator, an armature which can be moved by means of the actuator in an excitation direction relative to the base and guided by a linear guiding means parallel to the excitation direction and a pneumatic load compensation means which compensates for the gravity force of at least the armature, preferably in addition to that of the test specimen being excited.

Vibration exciters, often also called shakers, find their use in the investigation of the dynamic properties of a test specimen in a vibration testing layout. Vibration exciters are primarily used for purposes of materials science, wherein components or entire assemblies form the test specimen, for example. For this, the test specimen is excited with a defined test signal and at the same time the position and/or the state of motion of the test specimen is determined by suitable measurement means. These measurement means can have, besides strain gage strips, also vibration sensors or other sensors for positional determination or for determining the state of motion. From these determined measurement quantities, conclusions can be drawn as to the mechanical behavior, such as the fatigue behavior, for example.

Moreover, vibration exciters are known which are suited to investigating the actual measurement means, such as vibration sensors, for the investigation of vibrational processes, but also especially calibrating them, as proposed in ISO 16063.

The diversity of known vibration sensors in terms of measurement range, design size, and so forth, is very large. Besides very small and light vibration sensors for accelerations of up to one million g, where 1 g corresponds to the mean acceleration of the earth of 9.81 m/s$^2$, very large and heavy vibration sensors are also known, such as are used for example in seismometers.

Seismometers are used to detect ground tremors of earthquakes and other seismic waves. For this, seismometers have a mass mounted to vibrate on springs, and its mechanical vibration is measured. To determine the direction of an occurring ground tremor, seismometers are known with up to three such vibrational spring and mass systems. The mechanical vibrations such as typically occur during seismic processes are very small; the smallest detectable accelerations lie in the range of a few billionths of the normal mean acceleration of the earth, or g. The frequency range extends from around 50 Hz to only around one vibration per hour. The seismic mass needed for this, being 10 kg or more, is therefore very large.

Owing to the very small mechanical vibrations which occur, very high demands are placed on the mechanical boundary conditions of the vibration testing layout for the calibration of such large vibration sensor, i.e., vibration sensors with large seismic masses. With the vibration exciter it should be possible to generate a high-quality sinusoidal and perturbation-free exciter signal, distinguished by the most exactly maintained vibration amplitude, a low (<5%) distortion factor, i.e., the degree of unwanted distortions of the exciter signal, as well as a steady signal variation.

For the calibration of vibration sensors with a horizontal alternating vibration excitation, it is known how to use air bearings to reduce the friction. Especially high precision and dynamics of motion can be realized as compared to conventional mounting by plain bearings, roller bearings, or spring bearings. The basic notion of the air bearing consists in that the object being supported, as it were, floats on a film of air, such that the object being supported runs free of friction, except for the very low fluid friction inside the film of air and in the boundary layers of the air film with the adjoining surfaces. Accordingly, air bearings enable a low-friction movement of an object. Basically both linear and rotary air bearings are known, which in turn can be divided into static as well as dynamic air bearings. The geometrical appearance of air bearings is diversified. For example, cylindrical, rectangular or planar forms, as well as special geometrical forms are known.

In the case of the calibration of vibration sensors with a vertical alternating vibration excitation, the force needed for the vibration excitation is superimposed on the static gravity force of the vibration sensor in the earth's gravity field. In order for the same magnitude of the force of vibration excitation to be available for both excitation directions, i.e., contrary to and concurrent with the gravity force of the vibration sensor, it is known how to compensate for the weight forces. Various methods are known for this, what is common to all methods being that an additional static force is exerted, contrary to the gravity force of the test specimen being excited, such as a vibration sensor. The forces needed for this load compensation can be generated either electrodynamically, hydraulically, pneumatically, or by a spring force.

A calibration device, CS18 VLF, is known from the firm Spektra Schwingungstechnik and Akustik GmbH for the calibration of acceleration sensors in the horizontal and vertical direction with a vibration exciter. The vibration exciter comprises an actuator designed as a linear drive, which is used for the dynamic excitation of masses in the excitation direction. The movable part of the calibration device, a linear movable carriage, also called the armature, is connected by means of a linear designed air bearing to the stationary part of the calibration device, a base. For the calibration of vibration sensors in the vertical excitation direction, the calibration device comprises furthermore an electrical zero position control, which compensates for the gravity force exerted by the carriage and the vibration sensor. For this, a portion of the driving energy of the mentioned linear drive is used, so that the full force available for the actual vibration excitation does not have to be used against the gravity force.

Moreover, load compensations are known in which mechanical spring forces are used in order to compensate for the gravity force of a test specimen being excited. Basically, the drawback in the use of steel springs are the given strength limits and the resilience, as well as the possible excitation of resonances. When using elastomer springs, in addition nonlinearities arise which need to be compensated in order to generate a low-distortion exciter signal. Furthermore, the mentioned springs cause discontinuities in the exciter signal due to the external and internal friction present, such as are manifested for example in the stick-slip effect (static friction effect).

Moreover, load compensations are known which have a compressed medium, and thus one forming an excess pressure.

On the one hand, hydraulic cylinders are known for load compensation, such as are used for example to study the vibration behavior of entire vehicles. The compressed medium, in the present case hydraulic fluid, is kept in a closed system, while certain parts, in the present case the piston rod of the hydraulic cylinder, extend beyond the boundaries of the system. Accordingly, seals must be provided, such as shaft O-rings. These seals on the one hand have a disadvantageous wearing behavior and furthermore cause discontinuities in the exciter signal being generated due to the friction occurring.

Furthermore, it is known how to use compressed air in a rubber bladder load compensation. Thus, Tira GmbH offers a vibration testing layout which uses a so filled rubber bladder for the load compensation. The rubber bladder here is arranged beneath the moving part, the armature, in order to compensate for its gravity force. Frictional forces occur between the rubber bladder and adjoining components of the vibration testing layout, which in turn cause discontinuities in the exciter signal being generated.

The drawback to all known possibilities of load compensation is therefore that additional perturbation signals are generated by the friction and other nonlinearities occurring, which prevent the generating of a purely sinusoidal signal form, such as is needed for the calibration of vibration sensors, especially vibration sensors of large mass, i.e., in the range of 10 kg or more.

One problem which the invention proposes to solve is therefore to provide a vibration exciter with load compensation for the dynamic excitation of test specimens, wherein the friction and other nonlinearities occurring during the load compensation are minimized in order to generate high-quality low-perturbation exciter signals and wherein both the vibration path and the force needed for the vibration excitation are available in both excitation directions, i.e., directed contrary to and in the same direction as the gravity force, independently and unlimited by the load compensation of the gravity force.

BRIEF SUMMARY OF THE INVENTION

To solve the problem, it is provided in a vibration exciter with load compensation of the kind mentioned at the outset that the linear guiding means comprises an air bearing and that the load compensation means includes the linear guiding means.

Thanks to this low-friction vibration exciter with load compensation according to the invention, it becomes possible to generate very high-quality low-perturbation sinusoidal exciter signals so that, for example, a greater precision of calibration can be achieved when calibrating heavy vibration sensors in the vertical direction. Furthermore, it is advantageous that the driving energy of the actuator is not used for the load compensation. The driving energy of the actuator instead can be utilized for a substantially symmetrical application of excitation forces in the excitation direction. This is especially advantageous for the sinusoidal excitation of an object. Thanks to the correlation of the amplitude of excitation force with the amplitude of vibration, i.e., the same amplitudes of excitation force are required for the same amplitudes of excitation of the vibration magnitude regardless of the direction of the gravity force, especially high-quality sinusoidal exciter signals can be generated, which in turn means a greater precision of the calibration.

Another benefit of the low-friction vibration exciter with load compensation according to the invention is that it is very compact in configuration. This is due to the fact that the linear guiding means is included in the load compensation means. In other words, when the load compensation means is formed by an assembly of a set of individual components, the linear guiding means is formed from individual components of the same set. Put otherwise, the load compensation means and the linear guiding means share certain individual components of the mentioned assembly.

Thus, in a first embodiment it is proposed that the load compensation means comprises a pneumatic cylinder, whose piston rod and/or piston head is/are each guided in linear manner by an air bearing. The linear guiding means and load compensation means in this case share the piston rod and/or the piston as a common component of the aforementioned assembly. If the housing of the pneumatic cylinder is connected to the base and the movable piston or the piston rod to the movable armature and if the piston head and/or the piston rod are each guided by an air bearing, the compensation of the gravity force of the armature, and of the object optionally arranged on this, can occur in a low-friction way. Hence, non-linear friction-related effects can be minimized during the excitation of the armature by the actuator.

In another configuration according to the invention it can be provided that the load compensation means comprises n>1 pneumatic cylinders whose piston rod and/or piston head is/are each guided in linear manner by an air bearing. Thanks to the arrangement of a plurality of pneumatic cylinders n, these can be smaller in dimension for the compensation of a given gravity force than if a single larger dimensioned pneumatic cylinder were provided for this. Hence, the vibration exciter according to the invention is especially compact in design thanks to this configuration.

If the load compensation means comprises n>1 pneumatic cylinders, it can furthermore be provided that the n>1 pneumatic cylinders are arranged in a circle about the actuator each with the same center angles $\alpha=360°/n$. The center angle can also be called the centering angle. Thanks to this arrangement, an especially symmetrical compensation of the gravity force is achieved, in order to minimize other perturbing influences, such as introduced torques. It has been found that it is especially advantageous to choose n=3. Hence, the center angles each have $\alpha=120°$.

The notion of the invention also includes arrangements of pneumatic cylinders in other patterns, such as a square or a rectangle, wherein the actuator in such a configuration is arranged for example at the intersection of the diagonals of the square or rectangular pattern. It can furthermore be provided that a pneumatic cylinder has a piston surface in the form of a circular ring. In such a case, the actuator can be arranged centrally to the pneumatic cylinder, since the pneumatic cylinder surrounds the actuator. In the excitation direction both the actuator and the pneumatic cylinder can interact with the armature.

It is advisable for the actuator to comprise at least one linear drive. This linear drive can be designed either as a linear motor with electrodynamic principle of operation or as a linear actuator with piezoelectric, electrostatic, electromagnetic, magnetostrictive, thermoelectric, pneumatic or hydraulic principle of operation. It is advantageous for them to have a low-friction design, so that perturbing influences due to nonlinearity can likewise be minimized in this way.

In another embodiment it can be provided that the armature is connected to the base by a restoring means, wherein the action of the force of the restoring means is directed opposite the action of the force of the load compensation means.

In order to prevent damage during a malfunction or overstraining of the vibration exciter, an armature path limiting means can be provided. The armature path limiting means, formed for example by mechanical stops, limits the maximum possible path of the armature in the excitation direction.

Furthermore, one or more measurement means detecting the positioning and/or the motion condition of the armature, possibly having different principles of action, can be provided and coordinated with the vibration exciter for the detecting of at least one of the quantities "positioning" and "motion condition" of the armature. It is especially advantageous to provide noncontact measurement means for this, such as a laser vibrometer, since in this way the retroactive effect of the measurement means on the vibration exciter is ruled out, so that once again the perturbing influences are minimized. Thus, with the aid of the laser vibrometer as measurement means, it is possible to determine acceleration, velocity and distance at the same time by corresponding differentiation or integration of the velocity signal.

In the following, the invention will be further explained and described by means of preferred sample embodiments represented in the figures. There are shown:

BRIEF DESCRIPTION OF THE DRAWING FIGURES

Figure 2:
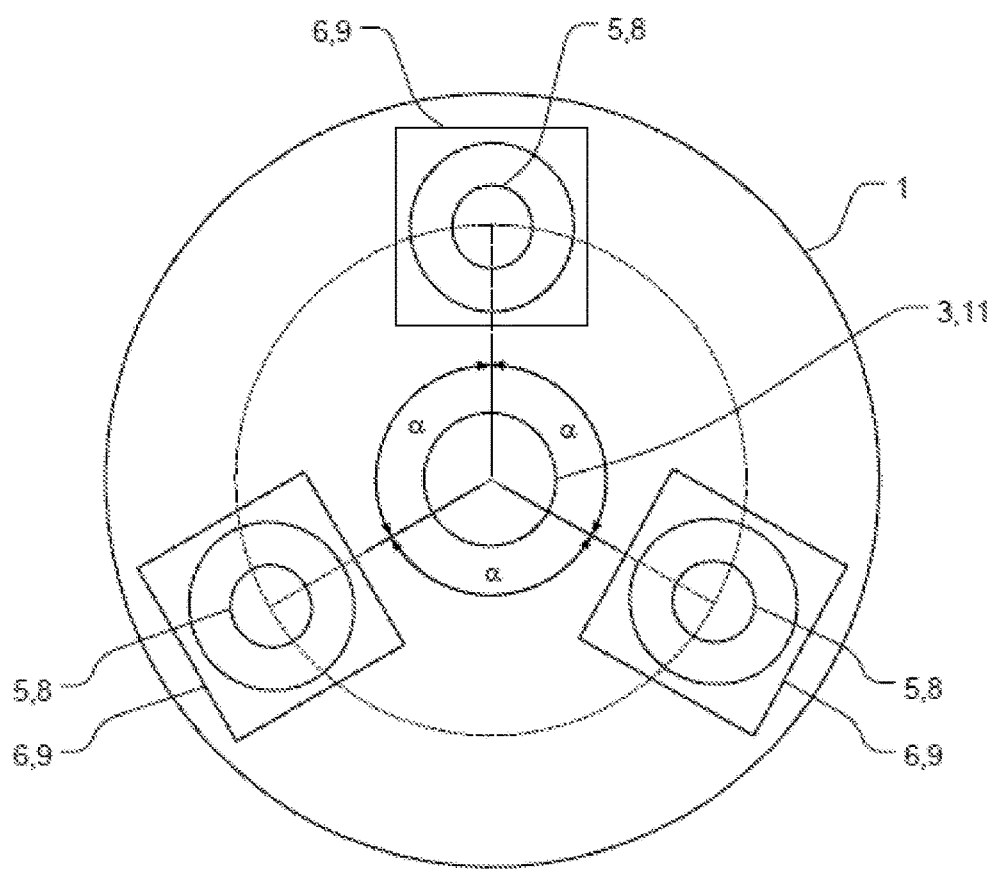

FIG. 1, a schematic, nondimensional side view of the vibration exciter with load compensation according to the invention, and FIG. 2, a schematic, nondimensional top view of a preferred embodiment of the vibration exciter with load compensation according to the invention with three pneumatic cylinders.

DETAILED DESCRIPTION

The very simplified schematic and nondimensional side view of the vibration exciter with load compensation according to the invention in FIG. 1 serves to represent the fundamental notion of the invention. It is meant first of all to show the basic layout and the interaction of the individual basic components of the vibration exciter according to the invention.

The low-friction vibration exciter with load compensation represented in FIG. 1 comprises a base 1, which can be arranged stationary on a structure (not shown), and an armature 2 which can move in an excitation direction 4 relative to this base 1. The vibration exciter according to the invention is very advantageously suitable for the low-friction dynamic vertical excitation of test specimen. Accordingly, the excitation direction 4 is parallel to the earth's gravitational field. The armature 2 is suitable for receiving a test specimen 15 which is going to be investigated or calibrated. The vibration exciter according to the invention is therefore not confined merely to the calibration of a vibration sensor. Instead, other investigations such as fatigue testing can also be carried out with the vibration exciter.

For the dynamic excitation of the test specimen 15, the base 1 is operatively connected by means of an actuator 3 to the armature 2. For this, in one preferred embodiment, a linear drive 11 is provided. This can be designed, for example, as an electrodynamic drive with plunger-type coil. The actuator 3 here is designed so that the armature 2 together with the test specimen 15 can move in the excitation direction 4 both with and against the earth's gravitational field. Furthermore, the actuator 3 is suited to exciting the armature 2 and the test specimen 15 in any given forms of motion, such as a harmonic sinusoidal excitation, a stochastic noiselike excitation, an abrupt shock excitation. The position of the armature 2 in the excitation direction 4 as a function of the time will be called the exciter signal.

A pneumatic load compensation means 6 is provided for the compensation of the gravity force 7 of the armature 2 and, in the event of a test specimen 15 arranged on the armature 2, likewise its gravity force 7. In a preferred embodiment, the load compensation means 6 is designed as a pneumatic cylinder 9. The housing of the pneumatic cylinder 9 is arranged firmly on the base 1.

In this way, the mass being moved and the gravity force 7 being compensated is reduced. The piston rod 92 of the pneumatic cylinder 9 is furthermore operatively connected to the armature 2, so that compensation forces 12 from a piston head 91 of the pneumatic cylinder 9 can be transmitted for the compensation of the gravity force 7 to the armature 2. The compensation force 12 can be controlled by means of the pressure of the pressurized air. Corresponding pressurized air generating means and control means are not shown, for simplicity. Thanks to the load compensation means 6, the same magnitudes of the excitation force are needed for the excitation of the armature 2 and the test specimen 15 by means of the actuator 3 in the excitation direction 4 with and against the earth's gravitational field. Moreover, in this way the same magnitudes of the maximum displacement, and therefore the maximum vibration path of the armature 2 in the excitation direction 4 can be achieved. The maximum vibration path in one embodiment can be limited by an armature path limiting means (not shown here), which protects the vibration exciter against destruction.

For the parallel guidance of the armature 2 in the excitation direction 4, the vibration exciter comprises a linear guiding means 5.

According to the invention, the linear guiding means 5 has an air bearing 8 for this purpose, so that high-quality low-perturbation sinusoidal signals can be generated. Low-perturbation exciter signals are characterized in that the vibration amplitude being generated is maintained as precisely as possible, the distortion factor is very low (<5%), and a signal form with no discontinuities is generated. Thanks to the use of an air bearing 8, the aforementioned stick-slip effects can be prevented in particular, so that the vibration amplitude of the armature 2 can also be better maintained.

Furthermore, it is provided that the load compensation means 6 includes the linear guiding means 5, which enables an especially compact design of the load-compensated vibration exciter. In one preferred embodiment it is therefore provided to use the air bearing 8 for the mounting of the piston rod 92 of the pneumatic cylinder 9. In a further embodiment, it can be provided that the piston 91 of the pneumatic cylinder 9 is likewise mounted by a further air bearing 8 in the cylinder of the pneumatic cylinder 8. The supplying of the air bearing 8 with pressurized air 10 comes from a pressurized air generating means, not otherwise indicated, with corresponding control means. The pressurized air generating means of the pneumatic cylinder 9 and of the air bearing 8 can be the same in this case, while thanks to corresponding valves (not shown) a separate supplying of the pneumatic cylinder 9 and the air bearing 8 is possible, even with different pressures. A portion of the pressurized air 10 for the supplying of the air bearing 8 works against the compensation force 12.

For the detection of the exciter signal, i.e., one of the quantities: position and movement state of the armature 2, a measurement means 13 is provided in one embodiment. The measurement means 13 in an especially advantageous embodiment is designed as a laser vibrometer 14. Moreover, the measurement means 13 can also be designed differently, for example, as an acceleration sensor, velocity sensor (electrodynamic principle), distance sensor (inductive, capacitive, magnetostrictive, laser triangulation, interference, imaging) or otherwise. Moreover, the measurement means 13 can also consist of several measurement means with different principles of operation. By means of the laser vibrometer 14, the exciter signal can be detected without contact and thus free of feedback to the vibration exciter. For this, the measurement means 13 can be connected to an evaluation device, not shown. If the test specimen is formed by an acceleration sensor, its measurement signals can likewise be processed in the evaluation device, not shown.

While FIG. 1 shows only one actuator 3, one linear guiding means 5 and one load compensation means 6, other embodiments are also possible in which more than one actuator 3, one linear guiding means 5 and one load compensation means 6 are provided.

Thus, FIG. 2 shows a schematic, nondimensional top view of a preferred embodiment of the load-compensated vibration exciter according to the invention, but FIG. 2 does not show the entire vibration exciter, only a portion of the basic components, in order to illustrate the arrangement of actuator 3, linear guiding means 5 and load compensation means 6 to each other. Shown in FIG. 2 is the base 1, where three load compensation means 6 each with a linear guiding means 5 and an actuator 3 are arranged on the base 1. As the load compensation means 6, a pneumatic cylinder 9 is provided, and as the linear guiding means 5 an air bearing 8. It has been found that it is especially advantageous to arrange the pneumatic cylinder 9 in the form of a circle around the actuator 3, the actuator being designed as a linear drive 11 in the form of an electrodynamic drive with plunger coil. The center angles α are all the same size at 120°. The radial distance between the pneumatic cylinder 9 and the actuator 3 is chosen such that a compact design of the vibration exciter is achieved.

As mentioned above, other arrangements of the actuator 3, the linear guiding means 5 and the load compensation means 6 to each other are also basically possible.

LIST OF REFERENCE NUMBERS

1 Base
2 Armature
3 Actuator
4 Excitation direction
5 Linear guiding means
6 Pneumatic load compensation means
7 Gravity force
8 Air bearing
9 Pneumatic cylinder
91 Piston
92 Piston rod
10 Pressurized air
11 Linear drive
12 Compensation force
13 Measurement means
14 Laser vibrometer
15 Test specimen
α Center angle

The invention claimed is:

1. A vibration exciter with load compensation for dynamic excitation of test specimens, comprising:
a base,
an armature, spaced from the base, for supporting a test specimen,
an actuator, connected between the base and the armature, for applying a dynamic excitation in an excitation direction parallel to a gravitational force, to a test specimen supported by the armature,
and pneumatic load compensation means which compensates for gravitational force of at least the armature, and includes a linear guiding means for parallel guidance of the armature in the excitation direction,
wherein the linear guiding means comprises an air bearing, and driving energy of the actuator is not used for load compensation.

2. The vibration exciter according to claim 1, wherein the load compensation means comprises a pneumatic cylinder, having a housing secured to the base, and a piston rod with one end secured to the armature and an opposite end having a piston head located within the housing, with the piston rod and/or the piston head guided in linear manner by the air bearing of the linear guidance means.

3. The vibration exciter according to claim 1, wherein the load compensation means comprises n>1 pneumatic cylinders, each with a piston rod and/or piston guided in linear manner by an air bearing of linear guidance means.

4. The vibration exciter according to claim 3, wherein the n>1 pneumatic cylinders are arranged in a circle about the actuator each with the same center angles α=360°/n.

5. The vibration exciter according to claim 1, wherein the actuator comprises at least one linear drive.

6. The vibration exciter according to claim 5, wherein the linear drive comprises a linear motor with electrodynamic, electromagnetic, magnetostrictive, thermoelectric, pneumatic or hydraulic operation.

7. The vibration exciter according to claim 1, wherein the armature is connected to the base by a restoring means, and action of force of the restoring means is directed opposite to action of force of the load compensation means.

8. The vibration exciter according to claim 1, further comprising an armature path limiting means.

9. The vibration exciter according to claim 1, further comprising a measurement means arranged to detect positioning and/or movement state of the armature.

10. The vibration exciter according to claim 9, wherein the measurement means comprises a laser vibrometer.

11. The vibration exciter according to claim 2, wherein the one end of the piston rod is secured to a bottom surface of the armature.

* * * * *